United States Patent
Hurwitz et al.

(10) Patent No.: US 9,647,267 B2
(45) Date of Patent: May 9, 2017

(54) RECHARGEABLE COPPER-ZINC CELL (71) Applicant: CUMULUS ENERGY STORAGE LIMITED, Rotherham (GB)

(72) Inventors: Michael David Hurwitz, Alameda, CA (US); Darron Rolfe Brackenbury, Moraga, CA (US)

(73) Assignee: CUMULUS ENERGY STORAGE LIMITED, Rotherham (GB)

( * ) Notice: Subject to any disclaimer, the term of this patent is extended or adjusted under 35 U.S.C. 154(b) by 0 days.

(21) Appl. No.: 14/770,009

(22) PCT Filed: Feb. 17, 2014

(86) PCT No.: PCT/GB2014/000054
§ 371 (c)(1),
(2) Date: Aug. 24, 2015

(87) PCT Pub. No.: WO2014/135828
PCT Pub. Date: Sep. 12, 2014

(65) Prior Publication Data
US 2016/0013485 A1    Jan. 14, 2016

(30) Foreign Application Priority Data

Mar. 4, 2013    (GB) .................... 1303759.3

(51) Int. Cl.
*H01M 2/02*    (2006.01)
*H01M 4/42*    (2006.01)
(Continued)

(52) U.S. Cl.
CPC ............. *H01M 4/42* (2013.01); *H01M 2/024* (2013.01); *H01M 2/025* (2013.01);
(Continued)

(58) Field of Classification Search
CPC ..... Y02E 60/528; H01M 2/024; H01M 2/025; H01M 2/1653; H01M 10/0418;
(Continued)

(56) References Cited

U.S. PATENT DOCUMENTS 684,204 A    10/1901    Edison
4,024,036 A    5/1977    Nakamura et al.
(Continued)

OTHER PUBLICATIONS

Written Opinion of the International Searching Authority in International Application No. PCT/GB2014/000054, dated Mar. 31, 2014, 5 pages.
(Continued)

*Primary Examiner* — Mark F Huff
*Assistant Examiner* — Monique Wills
(74) *Attorney, Agent, or Firm* — Faegre Baker Daniels LLP (57) ABSTRACT

A rechargeable cell comprising h combination a bipolar electrode, a zinc electrolyte, a copper electrolyte and metal-ion impermeable, polymer electrochemical membrane separator, wherein the zinc electrolyte and the copper electrolyte are separated from each other by the bipolar electrode on one side and by the membrane separator on the other side. A battery comprising at least one said rechargeable cell.

24 Claims, 4 Drawing Sheets (51) Int. Cl.
　　　*H01M 2/16*　　(2006.01)
　　　*H01M 8/18*　　(2006.01)
　　　*H01M 10/04*　　(2006.01)
　　　*H01M 10/36*　　(2010.01)
　　　*H01M 4/02*　　(2006.01)

(52) U.S. Cl.
　　　CPC ......... *H01M 2/1653* (2013.01); *H01M 8/188* (2013.01); *H01M 10/0418* (2013.01); *H01M 10/36* (2013.01); *H01M 2004/029* (2013.01); *H01M 2300/00* (2013.01); *Y02E 60/528* (2013.01)

(58) Field of Classification Search
　　　CPC .. H01M 10/36; H01M 4/42; H01M 2004/029; H01M 8/188; H01M 2300/00
　　　See application file for complete search history.

(56) References Cited

U.S. PATENT DOCUMENTS

| | | | |
|---|---|---|---|
| 4,037,333 A | 7/1977 | Olivieri | |
| 4,557,812 A * | 12/1985 | Goodridge | C25C 1/00 204/222 |
| 5,334,292 A | 8/1994 | Rajeshwar et al. | |
| 5,512,263 A | 4/1996 | McIntyre | |
| 5,523,181 A | 6/1996 | Stonehart et al. | |
| 5,682,261 A | 10/1997 | Takada et al. | |
| 2004/0029019 A1 | 2/2004 | Clarke | |
| 2011/0244277 A1* | 10/2011 | Gordon, II | H01M 2/38 429/51 |

OTHER PUBLICATIONS

International Search Report of the International Searching Authority in International Application No. PCT/GB2014/000054, dated Mar. 31, 2014, 3 pages.

International Preliminary Report on Patentability for PCT/GB2014/000054, Sep. 8, 2015, 6 pages.

\* cited by examiner

RECHARGEABLE COPPER-ZINC CELL

CROSS-REFERENCE TO RELATED APPLICATIONS

This application is a U.S. National Phase Patent Application based on International Application No. PCT/GB2014/000054 filed Feb. 17, 2014, which claims priority to British Patent Application No. 1303759.3 filed Mar. 4, 2013, the entire disclosures of which are hereby explicitly incorporated by reference herein.

FIELD OF THE INVENTION

The present invention relates to a rechargeable copper-zinc cell comprising a polymer membrane separator useful as an electron and proton conductive, but metal ions non-conductive and impermeable membrane separator.

BACKGROUND OF THE INVENTION

Recently, many experiments have been carried out in an attempt to develop rechargeable batteries having alkaline electrolyte and zinc compound used as a negative electrode material, because such a combination would have many excellent characteristics such as high energy density, high working voltage, reasonable material cost, excellent heavy drain duty performance and low temperature duty characteristics. After many technological efforts, improvements to obtain a long life for charge-discharge cyclic operations have been found. An electrode, for example, was made by coating a mixture of zinc oxide and/or zinc powder and mercury or mercuric oxide on a current collector wherein the zinc oxide and/or zinc powder comprised from 80 to 90 wt. % of the mixture and the mercury or mercuric oxide comprised 5 to 20 wt. %. However, the discharge capacity of the battery having this electrode gradually decreases if the battery is subjected to a repetitive charge-discharge operation even under the low current density of 2 to 3 mA/cm$^2$. In such an operation it was difficult to go over 50 cycles as the capacity decreased to half the initial capacity. The rechargeable batteries in commercial use must keep more than half of the initial capacity even after the 200$^{th}$ charging treatment. To produce such batteries, new improvements in the zinc electrode, the positive electrode, the separator and the electrolyte are necessary.

A good rechargeability for a battery can be expected, if the discharged product of the zinc electrode of the battery does not dissolve into the electrolyte during discharge. One electrode tested for preventing the dissolution was a sheet-like zinc electrode containing calcium hydroxide for fixing the discharge products as $CaZn(OH)_4$ on the electrode as reported by N. A. Zhulidov in U.S.S.R. Author's Certificate No. 116812 filed on Mar. 7, 1958. However, this electrode cannot endure high drain discharge service because of the formation of passive film on the zinc powder which is called passivation phenomena. Also, a semi-dry type negative electrode in which the amount of the electrolyte was restricted in order to prevent the dissolution of the reactive products into the electrolyte was tested but it, too, proved unsatisfactory.

U.S. Pat. No. 684,204 discloses a rechargeable copper/zinc battery. The battery did not, however, function properly, as it did not comprise a membrane.

U.S. Pat. No. 4,037,033 discloses a rechargeable nickel-zinc battery which is capable of undergoing many charge-discharge cycles.

Accordingly, there is a need for a copper-zinc rechargeable cell capable of many charge-discharge cycles at a high drain rate of discharge.

Conventional cation and proton conducting membranes typically comprise a sheet of a homogeneous polymer, a laminated sheet of similar polymers, or a blend of polymers.

A variety of polymers have been demonstrated to be cation conductors.

An example of such a polymer is a family of perfluorosulfonic acids (PFSA's), which are solid organic superacids, and membranes are produced as homogeneous sheets.

All of those polymer materials rely on sulfonate functionalities (R—$SO_3$—) as the stationary counter charge for the mobile cations (H+, Li+, Na+, etc.), which are generally monovalent.

Alternatives to polymer proton conductors include oxide proton conductors. A wide variety of metal oxides are proton conductors, generally in their hydrated or hydrous forms. These oxides include hydrated precious metal containing oxides, such as $RuOx (H_2O)_n$ and $(Ru—Ti)O_x (H_2O)$, acid oxides of the heavy post transition elements, such as acidic antimony oxides and tin oxides, and the oxides of the heavier early transition metals, such as Mo, W, and Zr. Many of these materials are also useful as mixed oxides. Some oxides which do not fit this description may be useful as well, such as silica $(SiO_2)$ and alumina $(Al_2O_3)$, although these are generally used as, or with, modifiers.

The number of metal oxides with the potential to serve as proton conductors is too large to fully discuss in detail here. This group, which can be summarized as those elements forming insoluble hydrated oxides that are not basic, includes not only known proton conductors, but oxide superacids that will furnish a multitude of free protons in the presence of an aqueous medium.

Zirconium phosphate, specifically alpha-zirconium phosphate is known to be an excellent proton conductor when tested as a powder at ambient temperature. Under these conditions the compound is hydrated $(Zr(HPO_4)_2(H_2O))$, and most of the conductivity is the result of protons migrating over the surface of the individual crystallites. Above 120° C. the water of hydration is lost and the conductivity drops substantially to a value representing the bulk conductivity of the solid, which increases from 1.42 at 200° C. to μ2.85.S at 300° C. With this combination of properties, alpha-zirconium phosphate is suitable for use in either low temperature (<100° C.) fuel cells, or in higher temperature (>150° C.) fuel cells.

This structure is not unique to alpha-zirconium phosphate. Hafnium, titanium, lead and tin all have phosphates that crystallize in this structure. These compounds have substantially less free volume in their structures than the zirconium compound, and are expected to show lower proton mobilities.

Tungsten and molybdenum offer two groups of proton conductors. The first of these groups are the simple, fully oxidized metals, as exemplified by tungsten trioxide $(WO_3)$. This compound has been the subject of much interest due to its electrochromic properties. This oxide can be repeatedly electrochemically reduced in the solid state, with a color shift from light yellow to blue, and reoxidized back to the light yellow form. This property has been used to produce electrochromic windows that can be lightened and darkened as desired. This reaction occurs without any significant rearrangement of the crystal lattice. As a result, maintaining charge neutrality requires a cation (proton) to diffuse into the structure and reside on an interstitial site. By maintaining an appropriate bias across an oxide film, a proton flux can be maintained.

The second family of tungsten and molybdenum compounds demonstrated to have high protonic conductivity are the hetero⁻ and homo⁻ polymolybdates and polytungstates. This description encompasses a broad range of compounds with widely varying compositions, all of which are based on the fusion of groups of $MO_6$ (M=Mo, W) octahedra by edge or corner sharing. These ions (and they are all anions) have a generic formula of $(X^{k+} M_n O_{(3n+m)})^{(2m-k)-}$ where k is the positive charge of the heteroatom, if any, and m is the number of unshared octahedral corners in the structure.

The variety of compounds in this category continues to expand, with new compounds being synthesized and characterized regularly. Some of them, such as the $(Mo_6V_{14}O_{84})^{14-}$ ion, have very complex structures.

Compounds in this family have been demonstrated to have room temperature proton conductivities as high as 0.17 S·cm$^{-1}$ for $H_3Wi_2PO_{40}$*29 $H_2O$ and 0.18 S cm$^{-1}$ for $H_3Mo_{12}PO_{40}$*29 $H_2O$ (this is over an order of magnitude greater than the conductivity of Nafion® measured under the same conditions). These compounds have the thermal stability to remain proton conducting above 200° C., albeit with a reduced conductivity. Not only are these compounds proton conductors in their own right, but when silica gel is doped with $H_3W_1PO_{40}$*29 $H_2O$ while it is being formed from tetraethoxysilane (TEOS) by a sol-gel reaction, then the product is an amorphous proton conductor with a conductivity that varies with the concentration of the tungstate, which may be present at up to about 50% by weight.

Another family of compounds that have been demonstrated to have high proton conductivity are the oxoacids of antimony. These compounds have a structure consisting of edge or corner shared $SbO_6$ octahedra. Unshared oxygens are protonated (i.e., hydroxyls) and charge neutrality is maintained by exchangeable external cations. In these acids, antimony can be in either the +3 or +5 oxidation states, or a mixture of the two, depending on the synthesis conditions and subsequent treatment. The key step in the synthesis is the hydrolysis of $SbCl_5$, with or without hydrogen peroxide, generally carried out at 0° C. The more oxidizing the hydrolysis conditions, the larger will be the fraction of the antimony in the +5 oxidation state in the final product, and with a sufficiently oxidizing hydrolysis solution it is possible to obtain acids with all of the antimony in the +5 state. The acid precipitates as an insoluble white powder having a pyrochlore-type framework structure (based on cubic symmetry). The powder is thoroughly washed and dried at room temperature before further use.

Antimonic acids are dehydrated on heating in dry air, with most of the water lost at around 140° C. As long as the material is not heated above 200° C. it will reabsorb water from air, even under normal room conditions, and return to its original weight. Heating to temperatures above 300° C. lead to deoxygenation, with the Sb$^{+5}$ present reverting to Sb$^{+3}$.

Thin films of antimonic acid have been produced on conductive surfaces by electrophoretically depositing fine particles suspended in a solution of ammonium hydroxide in acetone. Although the resulting layers were shown by SEM to be smooth, no information was given on whether or not they were pore free, a requirement for this application.

Like tungsten and molybdenum, tantalum and niobium form highly charged complex polyanions. These materials are also facile cation exchangers capable of proton conduction and subject to irreversible dehydration if heated above 100° C.

These families of inorganic ion exchangers have significant differences, but they also have three common features that make them candidates for use as proton conducting electrolytes in fuel cells. First, they all have easily exchangeable protons. Second, they all have open framework structures with channels to provide low resistance paths for the mobile protons to move along. Third, they all retain their proton conductivity at temperatures in excess of 200° C., and in most cases, in excess of 300° C. This last characteristic would appear to make it possible to use these compounds in fuel cells operating at slightly elevated temperatures, as well as at the same low temperatures (<100° C.) where conventional PEM (proton exchange membrane) fuel cells are used. Unfortunately, all of these oxide proton conductors are ceramic materials which are difficult to fabricate into thin, pin hole free, films.

There are other inorganic compounds, with significantly different structures, which also offer a high degree of proton mobility. These inorganic compounds include solid superacids and oxides with highly hydrated surfaces. The proton conductivity comes from protons diffusing over the surface of individual crystallites, or particles in the case of amorphous materials. This effect has already been described for fully hydrated alpha-zirconium phosphate.

Hydrated ruthenium oxides are one of the materials known to be capable of supporting a significant ionic current through the surface proton hopping mechanism described above. However, pure RuOx $(H_2O)_n$ would not be acceptable for use in electrolyte membranes since this compound is a metallic conductor. As such, it would electrically short circuit any cell in which it is used.

Ruthenium oxide "stuffed" Nafion® membranes have been tested as electrolyte membranes in direct methanol fuel cells and were demonstrated to reduce methanol crossover. Unfortunately, in this incarnation they were also found to reduce proton conductivity significantly.

A recently reported aerogel synthesis has been demonstrated to be particularly effective in generating proton conducting materials, largely because the products of this reaction have very high surface areas with a high degree of hydroxyl terminations and good electrical separation of local RuOx domains. $(Ru_{0.32}Ti_{0.68})O_2$ is a mixed conductor with both electrons and protons acting as charge carriers, and flowing in opposite directions. When normally synthesized as a bulk material, the majority of the current is carried by electrons. When the material is synthesized as an aerogel, with a greatly increased surface area, the majority of the charge is carried by protons. This is a clear demonstration of the surface protonic conductivity of RuO and a clear route to a way of utilizing it. The key to the aerogel process is keeping the widely dispersed sol-gel network, which is produced by the hydrolysis of a relatively dilute solution of metal alkoxides, separated as the solvent is removed. A similar effect can be harnessed in the production of membranes, as described in a later section of this disclosure.

Sulfated zirconia is an amorphous solid super acid that has recently received significant attention as an acid catalyst primarily for use in hydrocarbon conversions and as an acid support for other catalysts. Titanium oxides, and titanium-aluminum oxides, have been shown to have similar properties, but this discussion will focus on the better known zirconia compounds.

These materials are generally viewed as amorphous metal oxides with sulfate groups attached to their surface. They are produced by a variety of routes. The classical method is precipitation of amorphous $Zr(OH)_4$ by treating an aqueous solution of a zirconium salt with a base followed by sulfonation of the gel with either sulfuric acid or ammonium sulfate. The amorphous $Zr(OH)_4$ can also be produced by a sol-gel method, and sulfated in the same way. Both of these methods are essentially two-step syntheses. Higher surface area materials can be produced by the direct reaction of sulfuric acid with the alkoxide precursor. The catalyst is activated before use by calcination at temperatures between 400° C. and 650° C. Although these materials are strong Bronsted acids, like PFSA materials, they require water for the formation of free protons.

Solids with similar properties can also be produced with alumina ($Al_2O_3$) serving in place of zirconia. These materials are produced by combining a salt, such as $Li_2SO_4$ or $RbNO_3$, with the corresponding aluminum salt and sintering the mixture to convert the aluminum salt to an alumina matrix. The guest salt remains relatively unchanged. These materials can be pressed to form tablets about 1-2 mm thick, which were tested as fuel cell electrolytes. When operated at 400° C. they were found to produce promising results, with single cell potentials as high as 0.75 V observed at current densities of 200 $mA/cm^2$. The conductivity was attributed to protons moving along sites formed by the salt in the alumina matrix based on IR evidence of $H—SO_4$ coordination in the lithium containing electrolyte. However, because of the high temperature required for conductivity, these materials are not considered promising for use in a polymer bonded system.

All of the oxides described above are potentially useful as proton conductors, if they could be fabricated into sufficiently thin sheets that the conductivity would be similar to conventional polymeric membranes. The inability to produce thin sheets is a key weakness of materials produced by the approach or method used by Nakamora et al. (U.S. Pat. No. 4,024,036.)

In addition to inorganic cation conductors, inorganic-organic composite membranes are potentially useful for electrochemical applications. PFSA membranes, such as Nafion®, have been filled with 12-phosphotungstic acid ($H_3W_{12}PO_{40}$), an inorganic proton conductor. These membranes have been demonstrated to have better water retention and, consequently, better conductivity at temperatures above 100° C. than the same membranes in their unfilled form. The goal was to develop membranes for PEM fuel cells that could be operated at elevated temperatures to ameliorate the problem of CO poisoning for anode electrocatalysts. The addition of 12-phosphotungstic acid to the polymer electrolyte permitted operation at temperatures up to 120° C., but no evidence was shown for improved CO tolerance.

In U.S. Pat. No. 5,523,181, Stonehart et al. describe a composite membrane useful for PEM fuel cells consisting of high surface area silica, preferably in the form of fibers, as a filler with a variety of polymers capable of exchanging cations with solutions as the matrix. These membranes are produced by suspending the inorganic phase in a solvent appropriate for the dissolution of the polymer and blending the suspension with a solution of the polymer in the same solvent. Membranes are formed by evaporating the solvent in a controlled manner to produce a thin film of the composite. The silica is selected to maximize its affinity for water and ability to retain water. They demonstrate reduced electrical resistance in fuel cells operating under conditions of low humidification. The improved performance is attributed to improved water retention by the silica, and improved back diffusion of water from the cathode to the anode along the silica fibers with the back diffusing water replacing water removed by electroosmotic transport. They have not attributed any contribution to the overall proton conductivity to the silica.

In U.S. Pat. No. 5,512,263, McIntyre describes a composite membrane produced using an ionically conductive polymer together with an electrically conductive filler phase. This membrane permits the construction of an internally shorted fuel cell, which is described as useful for the synthesis of hydrogen peroxide. Since all of the electrical current flows internally within the membrane, there is no external electrical control or monitoring of the reaction. This lack of control may contribute to the relatively low efficiency of their process.

In U.S. Pat. No. 5,682,261, Takada et al. disclose a three phase system for producing a composite membrane. A Bronsted acid, typically a strong mineral acid is adsorbed onto the surface of finely divided silica and this mixture is combined with a thermoplastic binder to produce a proton conducting membrane. In this membrane the primary conductivity is due to free protons in the acid. This membrane has been found to be useful as an ion conductor for electrochromic windows and for fuel cells.

In U.S. Pat. No. 5,334,292, Rajeshwar et al. describe a composite consisting of an electron conducting polymer (as opposed to an ion conducting electrolyte) and catalytically active metal particles. The polymers they use are polypyrrole and polyanaline which are polymerized electrochemically on a conductive surface. This composite is described as being useful as a supported electrocatalyst where it is desirable to suspend precious (e.g., Pt, Pd, Ag, Ru, etc.) electrocatalytically active particles in an inexpensive conductive matrix to minimize the amount of precious metal used.

Inorganic-organic composite membranes may also be useful for a variety of other applications. These composites may include a Nafion® matrix and a semiconductor filler, where the semiconductors generally selected are those known to show activity for carrying out photocatalytic reactions, such as CdS, CdSe, $FeS_2$, ZnS, $TiO_2$, and $Fe_2O_3$. The composites produced are useful for carrying out reactions such as the photocatalytic decomposition and oxidation of organic compounds and even the fixation of nitrogen.

In their article entitled "Nafion/ORMOSIL Hybrids via in Situ Sol-Gel Reactions. 3. Pyrene Fluorescence Probe Investigations of Nanoscale Environment," (Chemistry of Materials, 9, 36-44, (1997), Mauritz et al. describe PFSA-silica composites by the hydrolysis of tetraethoxysilane (TEOS) inside the polymer matrix. The inorganic-organic ratio can be varied over a wide range, as can the properties of the inorganic phase, permitting the properties of the final composite to be tailored for specific applications. These composite materials have been demonstrated to have improved selectivity for gas separation when compared to the unfilled polymer. Mauritz et al. have also demonstrated the ability to produce nanophase composites with $TiO_2$, titaniasilicate, and aluminasilicate inorganic phases.

Accordingly, there is a need for a membrane separator material exhibiting high water, electrons and protons conductivity and, at the same time, not being conductive to metal ions.

SUMMARY OF THE INVENTION

It is therefore an object of this invention to provide a long cycle life rechargeable copper-zinc bipolar cell.

It is still further an object of this invention to provide a rechargeable copper-zinc bipolar cell comprising an electrochemical polymer membrane separator useful as an electron and proton conducting membrane. The polymer electrochemical membrane separator is not metal ions conducting.

These objects are accomplished by a combination of a bipolar electrode, a zinc electrolyte, a copper electrolyte and a metal-ion impermeable, polymer electrochemical membrane separator. The zinc electrolyte and the copper electrolyte are separated from each other by the bipolar electrode on one side and by the membrane separator on the other side. Discharging involves electro-depositing copper from the copper electrolyte on the negative side of the bipolar electrode while corroding zinc from the positive side of the bipolar electrode into the zinc electrolyte. The charging of the system involves the reverse of this process, electro-depositing zinc from the zinc electrolyte on the positive side of the bipolar electrode while corroding copper from the negative side of the bipolar electrode into the copper electrolyte.

The primary function of the metal-ion impermeable, polymer electrochemical membrane separator is to separate the copper half-cell from the zinc half-cell such that the copper ions and the zinc ions remain in their respective half-cells, but still permitting protons and electrons to pass through.

The bipolar electrode may be made of a single conductive material, or a combination of more than one conductive materials, or layers of material to give suitable conductivity, corrosion resistance, mechanical strength and electroplated material adhesion.

According to a first aspect of the present invention, there is provided a metal-ion impermeable, polymer electrochemical membrane separator comprising a first polymer, a second polymer and functionalizing groups.

Preferably, the metal-ion impermeable, polymer electrochemical membrane separator comprises polystyrene, polyethylene terephthalate and functionalizing groups. The membrane separator isolates copper and zinc on either side of the membrane separator with a permeation rate of less than 1 μmol/day. The functional groups are chemically bonded to polystyrene and polyethylene terephthalate and contain a mixture of compounds which may include $MePO_3$ and $EtCO(OH)$.

According to another aspect of the present invention, the rechargeable copper-zinc bipolar cells are combined in batteries, electrowinning systems with the voltage of 1000V, 320 KV, 500 KV, 800 KV to correspond to HVDC grid. The voltage of 1000V would enable the energy storage to be connected to the low voltage part of the electricity network. A battery comprises at least one cell.

Embodiments described herein may have an advantage that the conversion of the transformer and AC/DC is eliminated.

Embodiments described herein may have another advantage that maintenance of the cell is relatively easy due to "tank" configuration when compared with closed cell electrolyzer configuration.

Embodiments described herein may have another advantage that the cell configuration eliminates pumping and, as a result of that, parasitic pumping losses.

Embodiments described herein may have another advantage that bypass currents and manifolds are eliminated.

Embodiments described herein may have another advantage that the cell is a long-life cell.

Embodiments described herein may have another advantage that individual cells can be removed, maintained and replaced if required without affecting the overall battery operation. The life-time of the battery is then in the range of 20-30 years.

Embodiments described herein may have another advantage that the membrane separator has selective permeability (it is not permeable to metal ions) and is highly conductive.

Other aspects are as set out in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE EMBODIMENTS

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

There will now be described several different embodiments and variations of a rechargeable copper-zinc cell.

Figure 1:
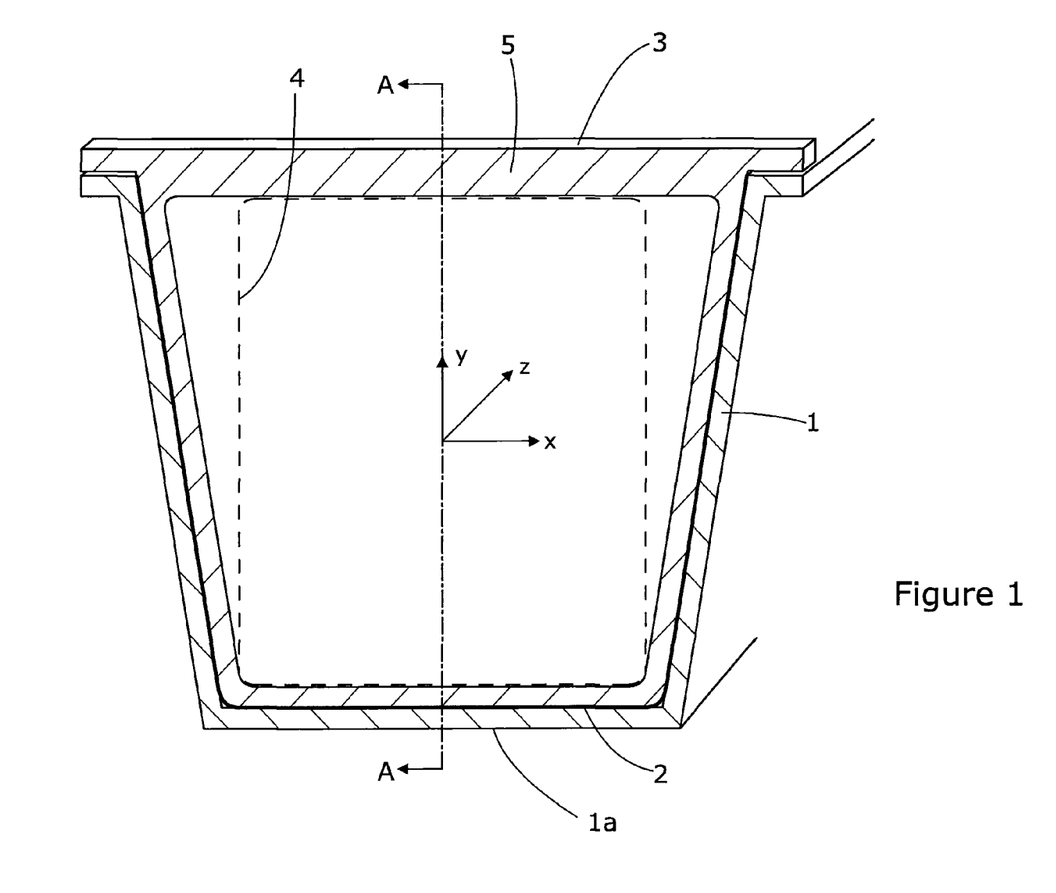
FIG. 1 illustrates a cross-section of a rechargeable copper-zinc cell

FIG. 1 is a schematic cross-section depiction of a rechargeable copper-zinc cell according to a particular embodiment of the invention. The cell comprises a tank (1) with a sealing surface (2) and a tank bottom (1a), a cassette (3), a metal-ion impermeable, polymer electrochemical membrane separator (4) and a polymer frame (5) of the cassette (3).

Figure 2:
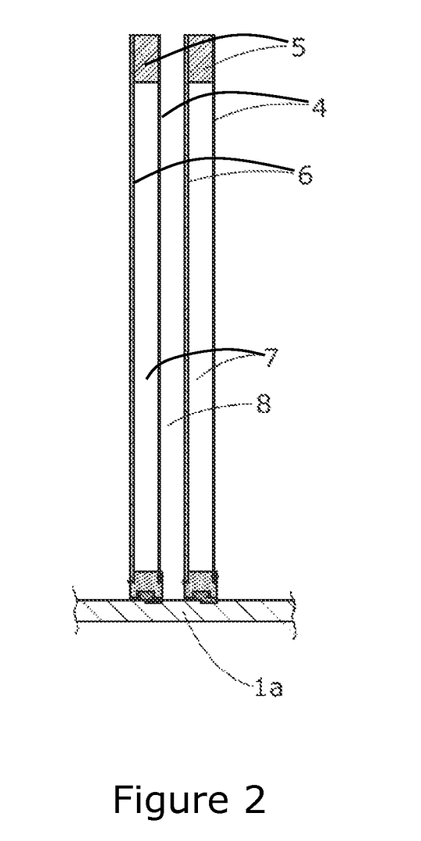
FIG. 2 illustrates a profile view of a rechargeable copper-zinc cell

FIG. 2 is a schematic section view of a rechargeable copper-zinc cell according to a particular embodiment of the invention. The cell comprises a tank bottom (1a) and a plurality of cassettes (3). Each cassette (3) includes a polymer frame (5), a metal-ion impermeable, polymer electrochemical membrane separator (4), a bipolar electrode (6), a zinc electrolyte space (7) and a copper electrolyte space (8) positioned between the separator (4) of one cassette (3) and the electrode (6) of an adjacent cassette (3).

Figure 3:
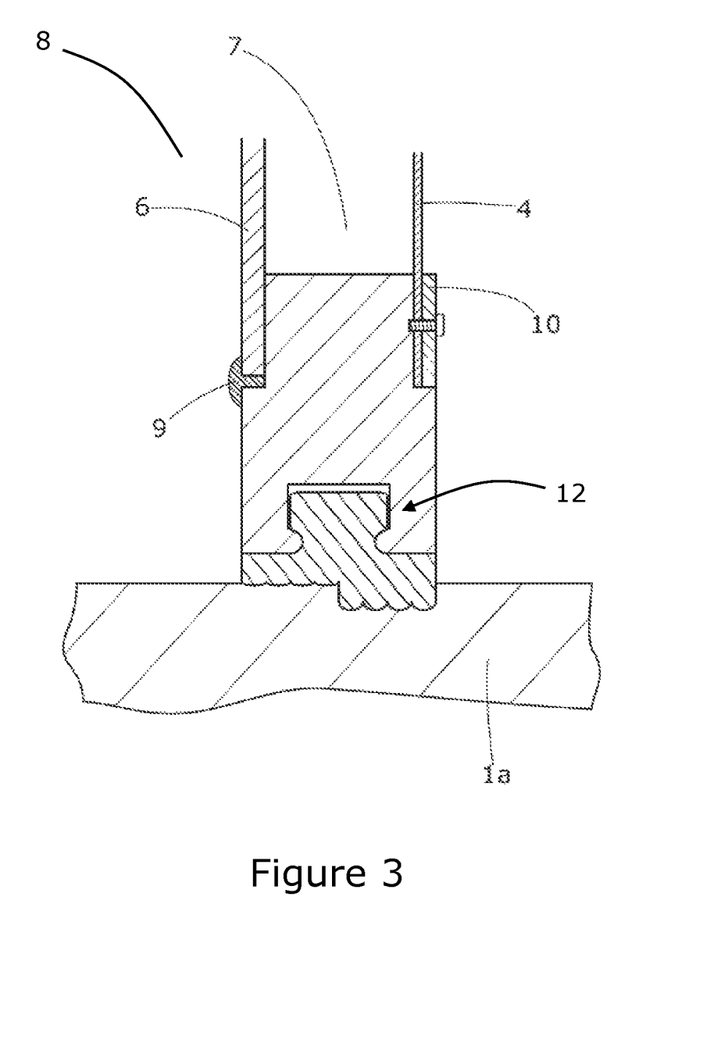
FIG. 3 illustrates a detail view of a rechargeable copper-zinc cell with a metal-ion impermeable, polymer electrochemical membrane separator.

FIG. 3 is a detail view of a rechargeable copper-zinc cell according to a particular embodiment of the invention. The cell comprises a bipolar electrode (6), a metal ion impermeable, polymer electrochemical membrane separator (4), a tank bottom (1a), a polymer weld or other fastening (9) of a bipolar electrode (6) to the frame (5), a fastening (10) of a metal-ion impermeable, polymer electrochemical membrane separator (4) to the frame (5), and a zinc electrolyte space (7) between the bipolar electrode (6) and the membrane separator (4). As shown in FIG. 3, the frame (5) may be coupled to the tank bottom (1a) via a tongue and groove connection (12), for example.

Figure 4:
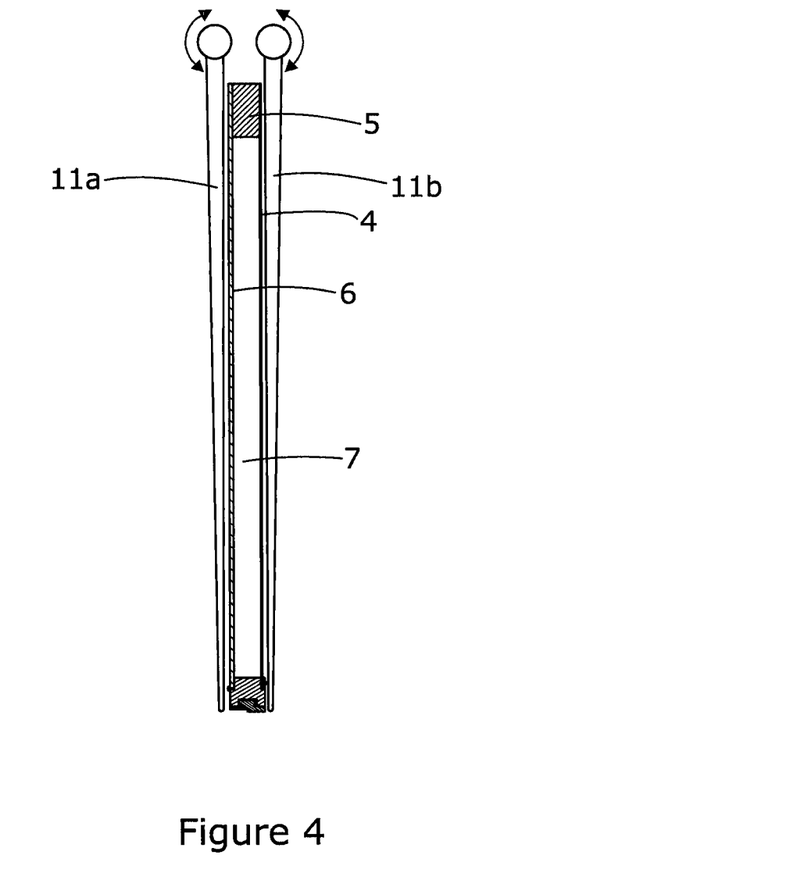
FIG. 4 illustrates a removal device for a rechargeable copper-zinc cell

FIG. 4 is a depiction of a particular embodiment of a removal device for inserting and extracting one or more cassettes (3) to and from a tank (1). A battery comprises one or more cassettes (3) mounted in a tank (1) (See FIGS. 1 and 2). Each cassette (3) comprises a bipolar electrode (6), a zinc electrolyte space (7), a metal ion impermeable, polymer electrochemical membrane separator (4) and a polymer frame (5). A rechargeable cell comprises in combination a bipolar electrode (6), a zinc electrolyte in the zinc electrolyte space (7), a copper electrolyte in the copper electrolyte space (8) (See FIG. 2) and a metal-ion impermeable, polymer electrochemical membrane separator (4). A battery comprises at least one rechargeable cell. The removal device comprises mechanical support structures (11a), (11b) that are inserted into the tank (1) from the top and are then clamped onto both sides of the cassette (3). The mechanical support structures (11a), (11b) hold the frame (5) of the cassette (3) and prevent distortion of a bipolar electrode (6) and a metal-ion impermeable, polymer electrochemical membrane separator (4) during insertion and removal of the cassette (3) to and from the tank (1).

The invention claimed is:

1. A rechargeable cell comprising:
 a bipolar electrode;
 a zinc electrolyte;
 a copper electrolyte; and
 a metal-ion impermeable, electrochemical membrane separator,
 wherein the zinc electrolyte and the copper electrolyte are separated from each other by the bipolar electrode on one side and by the membrane separator on the other side.

2. The rechargeable cell of claim 1, wherein the bipolar electrode is made of an electrically conductive material.

3. The rechargeable cell of claim 1, wherein the separator comprises a polymeric material.

4. The rechargeable cell of claim 1, wherein the bipolar electrode is layered.

5. The rechargeable cell of claim 1, wherein the membrane separator comprises a first polymer, a second polymer and functional groups.

6. The rechargeable cell of claim 5, wherein the first polymer is polystyrene and the second polymer is polyethylene terephthalate.

7. The rechargeable cell of claim 5, wherein the functional groups are selected from the group consisting of $MePO_3$, $EtCO(OH)$, and combinations thereof.

8. A battery comprising:
 a plurality of rechargeable cells, each of the cells comprising:
  a bipolar electrode;
  a zinc electrolyte;
  a copper electrolyte; and
  an electrochemical membrane separator,
  wherein the zinc electrolyte and the copper electrolyte are separated from each other by the bipolar electrode on one side and by the membrane separator on the other side.

9. The battery of claim 8, wherein the bipolar electrode comprises an electrically conductive material.

10. The battery of claim 8, wherein the membrane separator separates the copper electrolyte and the zinc electrolyte on either side of the membrane separator with a permeation rate through the membrane separator of less than 1 μmol/day.

11. The battery of claim 8, wherein the membrane separator comprises polystyrene, polyethylene terephthalate, and functional groups.

12. The battery of claim 11, wherein the functional groups are bonded to the polystyrene and polyethylene terephthalate.

13. The battery of claim 11, wherein the functional groups are selected from the group consisting of methylphosphonate, propionic acid, and combinations thereof.

14. The battery of claim 8, wherein the bipolar electrode has a positive side and a negative side, and wherein the battery is discharged by depositing copper from the copper electrolyte onto the negative side of the bipolar electrode and corroding zinc from the positive side of the bipolar electrode into the zinc electrolyte.

15. The battery of claim 8, wherein the bipolar electrode has a positive side and a negative side, and wherein the battery is charged by depositing zinc from the zinc electrolyte onto the positive side of the bipolar electrode and corroding copper from the negative side of the bipolar electrode into the copper electrolyte.

16. The battery of claim 8, wherein the battery operates at a voltage of about 1000V to about 800 KV.

17. The battery of claim 8, wherein the plurality of cells is contained within a tank.

18. The battery of claim 8, wherein the battery does not have a pump.

19. The battery of claim 8, wherein each of the cells further comprises a frame coupled to the bipolar electrode and the membrane separator, the zinc electrolyte being located between the bipolar electrode and the membrane separator of the frame.

20. The battery of claim 19, wherein each of the cells further comprises a first fastener that couples the bipolar electrode to the frame and a second fastener that couples the membrane separator to the frame.

21. A rechargeable battery comprising:
 a tank;
 one or more cassettes removably mounted in the tank;
 a bipolar electrode;
 a zinc electrolyte;
 a copper electrolyte; and
 a separator,
 wherein the zinc electrolyte and the copper electrolyte are separated from each other by the bipolar electrode on one side of the cassette and by the membrane separator on the other side of the cassette.

22. The battery of claim 21, wherein the cassette includes a polymer frame.

23. The battery of claim 21, further comprising:
 a fastening of the bipolar electrode to the frame; and
 a fastening of the membrane separator to the frame.

24. The battery of claim 21, wherein the cassette is coupled to the tank via a tongue and groove connection.

* * * * *